United States Patent
Pike et al.

[11] Patent Number: 5,721,180
[45] Date of Patent: Feb. 24, 1998

[54] LAMINATE FILTER MEDIA

[76] Inventors: Richard Daniel Pike, 5544 Fort Fisher Way, Norcross, Ga. 30092; Peter Wyndham Shipp, Jr., 114 Junalsuka Dr., Woodstock, Ga. 30188

[21] Appl. No.: 577,955
[22] Filed: Dec. 22, 1995
[51] Int. Cl.$^6$ .................................... B32B 33/00
[52] U.S. Cl. .................... 442/346; 264/405; 442/351; 442/364; 442/382; 442/400; 442/401
[58] Field of Search ........................ 428/284, 286, 428/297, 298, 219, 373, 374, 903; 55/DIG. 39; 264/405; 442/344, 346, 351, 364, 382, 400, 401

[56] References Cited

U.S. PATENT DOCUMENTS

| | | | |
|---|---|---|---|
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 3,855,046 | 12/1974 | Hansen et al. | 161/150 |
| 3,978,185 | 8/1976 | Butin et al. | 264/93 |
| 4,068,036 | 1/1978 | Stanistreet | 428/296 |
| 4,211,661 | 7/1980 | Perry | 210/491 |
| 4,215,682 | 8/1980 | Kubik et al. | 128/205 |
| 4,340,563 | 7/1982 | Appel et al. | 264/518 |
| 4,375,718 | 3/1983 | Wadsworth et al. | 29/592 |
| 4,377,615 | 3/1983 | Suzuki et al. | 428/213 |
| 4,478,620 | 10/1984 | Tamura | 55/486 |
| 4,588,457 | 5/1986 | Crenshaw et al. | 156/62.8 |
| 4,595,629 | 6/1986 | Mays | 428/286 |
| 4,678,703 | 7/1987 | Shibasaki et al. | 428/288 |
| 4,681,801 | 7/1987 | Eian et al. | 428/283 |
| 4,689,058 | 8/1987 | Vogt et al. | 55/279 |
| 4,714,647 | 12/1987 | Shipp, Jr. et al. | 428/212 |
| 4,840,840 | 6/1989 | Flynn et al. | 428/283 |
| 4,863,785 | 9/1989 | Berman et al. | 428/218 |
| 4,904,521 | 2/1990 | Johnson et al. | 428/284 |
| 4,917,942 | 4/1990 | Winters | 428/286 |
| 4,925,601 | 5/1990 | Vogt et al. | 264/6 |
| 5,039,431 | 8/1991 | Johnson et al. | 264/113 |
| 5,108,474 | 4/1992 | Riedy et al. | 55/485 |
| 5,120,888 | 6/1992 | Nohr et al. | 524/99 |
| 5,145,727 | 9/1992 | Potts et al. | 428/198 |
| 5,149,576 | 9/1992 | Potts et al. | 428/198 |
| 5,219,633 | 6/1993 | Sabee | 428/109 |
| 5,229,191 | 7/1993 | Austin | 428/198 |
| 5,232,770 | 8/1993 | Joseph | 428/284 |
| 5,306,534 | 4/1994 | Bosses | 428/35.2 |
| 5,366,792 | 11/1994 | Shirayanagi et al. | 428/196 |
| 5,382,400 | 1/1995 | Pike et al. | 264/168 |
| 5,401,446 | 3/1995 | Tsai et al. | 264/22 |
| 5,418,045 | 5/1995 | Pike et al. | 428/198 |
| 5,609,947 | 3/1997 | Kamei et al. | 428/212 |

FOREIGN PATENT DOCUMENTS

| | | | |
|---|---|---|---|
| 0 369 032 | 5/1990 | European Pat. Off. | |
| 0 395 331 | 10/1990 | European Pat. Off. | |
| 0 488 822 | 6/1992 | European Pat. Off. | |
| 7-163819 | 6/1995 | Japan | B01D 39/16 |
| 8-199466 | 8/1996 | Japan | D04H 1/56 |
| 91/19034 | 12/1991 | WIPO | |
| 95/13856 | 5/1995 | WIPO | B01D 39/08 |

*Primary Examiner*—James J. Bell
*Attorney, Agent, or Firm*—Michael U. Lee

[57] ABSTRACT

The present invention provides a self-supporting laminate filter medium having an electret lofty spunbond web and an electret microfiber web, wherein the spunbond web has a density between about 0.01 g/cm$^3$ and about 0.1 g/cm$^3$.

20 Claims, 1 Drawing Sheet

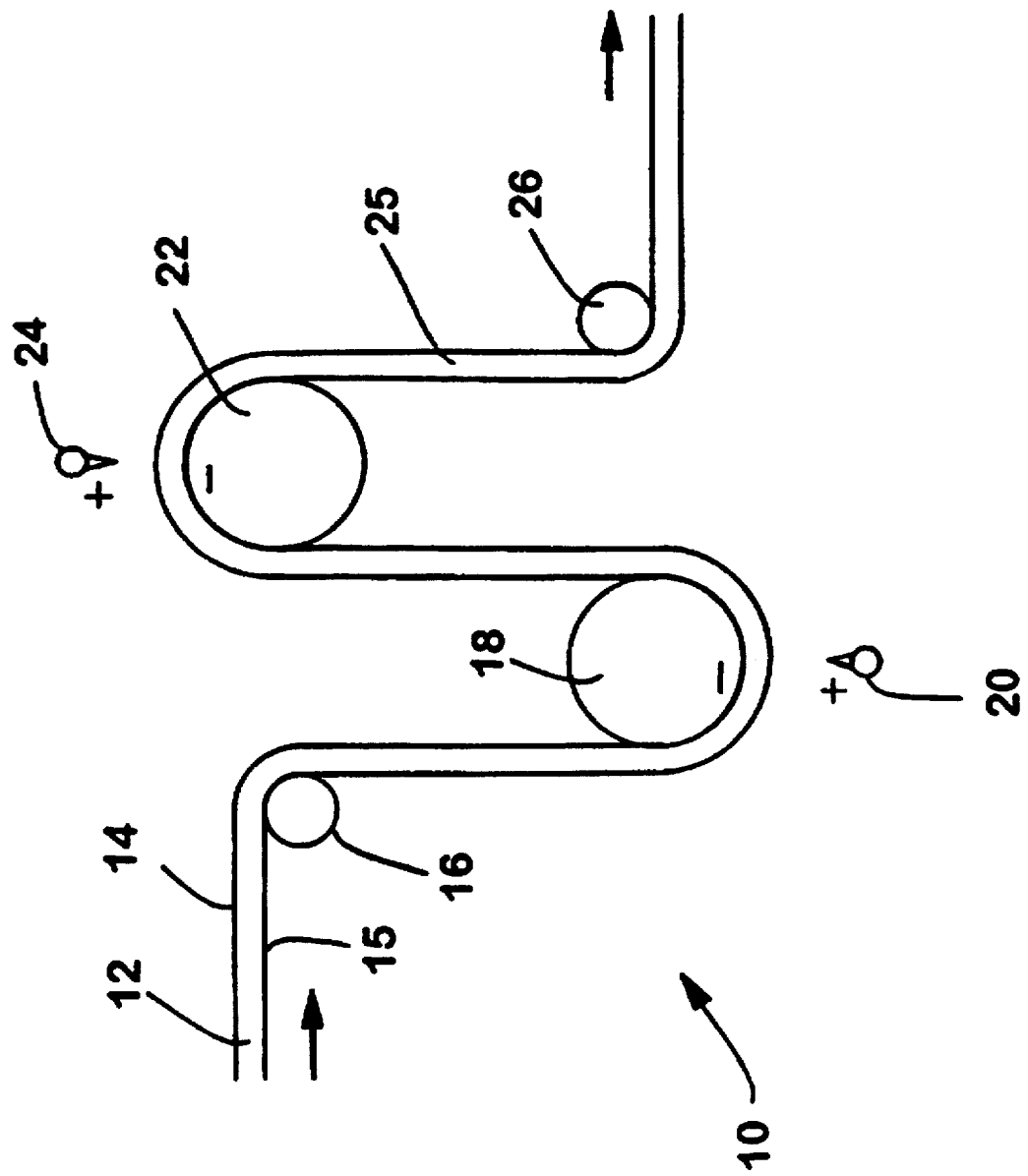

LAMINATE FILTER MEDIA

BACKGROUND OF THE INVENTION

The present invention is related to a filter medium. More specifically, the present invention is related to a filter medium for gaseous fluids.

Filter media having large interfiber pores and, thus, a high permeability typically contain sparsely packed relatively thick fibers. Such filter media require relatively low driving pressure to provide adequate filtration throughput rate and extended service-life. However, highly permeable filter media, e.g., residential glass fiber HVAC filters, only provide a low filtration efficiency in that the large interfiber pore structures of the media do not have interstitial configurations that are suitable for entrapping fine contaminant particles. Consequently, coarse fiber filter media have not been used in fine particle filtration applications.

In contrast, microfiber nonwoven webs, such as meltblown fiber webs, have been used as fine particle filter media. The densely packed fine fibers of these webs provide fine interfiber pore structures that are highly suitable for mechanically trapping or screening fine particles. However, the fine pore structure of meltblown fiber webs and other similar microfiber webs that have densely packed fine fibers results in a low permeability, creating a high pressure drop across the webs. Consequently, the low permeability of fine fiber filter media requires a high driving pressure to establish an adequate filtration throughput rate. Furthermore, as contaminants accumulate on the surface of the filter media, the contaminants quickly clog the small interfiber pores and further reduce the permeability of the media, thereby even further increasing the pressure drop across the media and rapidly shortening the service-life.

Additionally, microfiber web filter media do not tend to have a physical integrity that is sufficient enough to be self-supporting. Although the physical integrity of microfiber filter media can be improved by increasing the basis weight or thickness thereof, the increased basis weight or thickness exacerbates the pressure drop across the filter media. As such, microfiber web filter media are typically laminated to a supporting layer or fitted in a rigid frame. However, the conventional supporting layer or rigid frame does not typically contribute to the filtration process and only increases the production cost of the filter media.

There remains a need for self-supporting filter media that provide combinations of desirable filter properties, including high filtration efficiency, high permeability, low pressure drop, high throughput rate and long service-life.

SUMMARY OF THE INVENTION

The present invention provides a laminate filter medium having an electret lofty spunbond web and an electret microfiber web, wherein the spunbond web has a density between about 0.01 g/cm$^3$ and about 0.1 g/cm$^3$. The invention also provides a laminate filter medium containing an electret lofty spunbond web and an electret meltblown fiber web, wherein the conjugate filaments have at least one polyolefin component polymer and the meltblown fibers have a polyolefin component. The lofty spunbond web of the filter medium contains crimped multicomponent conjugate spunbond filaments, and the lofty spunbond web has a density between about 0.01 g/cm$^3$ and about 0.1 g/cm$^3$. Additionally provided is a process for filtering a gas medium with the laminate filter medium of the present invention.

The filter media of the invention provide highly advantageous filter properties including high filter efficiency and high capacity or long service-life, making the media highly useful for, e.g., various HVAC and combustion engine filter applications.

BRIEF DESCRIPTION OF THE DRAWING

FIG. illustrate an electretizing process suitable for the present laminate filter media layers.

DETAILED DESCRIPTION OF THE INVENTION

There is provided in accordance with the present invention a self-supporting laminate filter medium having a high filter efficiency and a long service-life. The filter medium contains at least one layer of an electretized lofty spunbond nonwoven web and at least one layer of an electretized microfiber web. The laminate filter medium is highly suitable for gaseous filtration applications, e.g., HVAC filters.

The lofty layer is characterized in that it contains crimped continuous filaments and that the filaments form substantially evenly distributed interfiber bonds throughout the web such that the lofty layer has a large interfiber void volume and a low density. The interfiber bonds of the web are formed where the filaments make contact with one another, especially at cross-over contact points. In accordance with the invention, the lofty spunbond web layer has a density between about 0.01 g/cm$^3$ and about 0.1 g/cm$^3$, desirably between about 0.015 g/cm$^3$ and about 0.075 g/cm$^3$, and more desirably between about 0.02 g/cm$^3$ and about 0.05 g/cm$^3$. In addition, the lofty layer, which has a large interfiber void volume, desirably has a Frazier permeability of at least about 100'ft$^3$/minute/ft$^2$ (cfm/sf), desirably between about 100 cfm/sf and about 2500 cfm/sf, more desirably between about 150 cfm/sf and about 2000 cfm/sf, as measured in accordance with Federal Test Method 5450, Standard No. 191A. It is believed that the low-density and porous structure of the lofty layer provide numerous but tortuous paths for gas to travel therethrough and, thus, provide highly suitable means for mechanically and electrostatically trapping particulates or contaminants, thereby providing a high filter efficiency without a high pressure drop across the filter media. In addition, the evenly distributed interfiber bonds of the lofty layer impart high physical integrity and strength in the layer, thereby making the lofty layer and the laminate filter media containing the lofty layer self-supporting.

Desirable lofty nonwoven webs suitable for the lofty layer include nonwoven webs containing crimped multicomponent conjugate spunbond filaments, i.e., crimped multicomponent conjugate spunbond webs. The term "multicomponent conjugate filaments" as used herein indicates filaments containing at least two different component polymers that are arranged to occupy distinct sections across the cross-section of each of the filaments along the entire or substantially entire length thereof. The term "spunbond filaments" as used herein indicates small diameter filaments that are formed by extruding one or more molten thermoplastic polymers as filaments from a plurality of capillaries of a spinneret. The extruded filaments are cooled while being drawn by an eductive or other well-known drawing mechanism to form spunbond filaments. The drawn spunbond filaments are then deposited or laid onto a forming surface in a random manner to form a loosely entangled and uniform fiber web. The laid fiber web is then subjected to a bonding process to impart physical integrity and dimensional stability. Typically, spunbond filaments have an average diameter of at least about 10 μm. Exemplary processes for producing spunbond nonwoven webs are disclosed, for example, in U.S. Pat. Nos. 4,340,563 to Appel et al., 3,802,817 to Matsuki et al., 3,855,046 to Hansen et al. and 3,692,618 to Dorschner et al.

In accordance with the present invention, the conjugate filaments of the lofty layer contain at least two component polymers having different melting points, and the lowest melting component polymer forms at least a portion of the peripheral surface of each of the filaments. The component polymers desirably are selected to have a melting point difference between the highest melting component polymer and the lowest melting component polymer of at least about 5° C., more desirably at least about 10° C., most desirably at least about 30° C., such that the lowest melting polymer can be melted or rendered tacky without melting the higher melting component polymers of the filaments. The difference in melting point is advantageously used to bond nonwoven webs containing the conjugate filaments. When a nonwoven web containing the conjugate filaments is heated to a temperature equal to or higher than the melting point of the lowest melting component polymer but below the melting point of the highest melting component polymer, the melted peripheral portions of the filaments form interfiber bonds, especially at the cross-over contact points, throughout the web while the high melting polymer portions of the filaments maintain the physical and dimensional integrity of the web.

The multicomponent conjugate filaments suitable for the lofty layer are crimped to form a lofty nonwoven web. Suitable filaments for the present filter media have at least about 2 crimps per extended inch (2.54 cm), desirably between about 2 and about 50 crimps per extended inch, more desirably between about 3 and about 30 crimps per extended inch, as measured in accordance with ASTM D-3937-82. The filaments can be crimped before or after the filaments are deposited to form a nonwoven web. However, as a specific embodiment of the present invention, it is highly desirable to crimp the filaments before they are deposited to form a nonwoven web in order to ensure dimensional stability and uniformity of the web. This is because filaments inevitably change their dimensions when crimps are imparted therein, and it is highly impractical to control the movement of crimping filaments to protect against dimensional and uniformity changes in the web, which inevitably accompany the crimping process.

A particularly suitable process for producing crimped multicomponent spunbond webs useful for the present lofty layer is disclosed in U.S. Pat. No. 5,382,400 to Pike et al., which patent in its entirety is herein incorporated by reference. Briefly, a particularly desirable process for producing a multicomponent conjugate spunbond web includes the steps of melt-spinning continuous multicomponent conjugate filaments, at least partially quenching the multicomponent filaments so that the filaments have latent crimpability, drawing the filaments and activating the latent crimpability by applying heated drawing air, and then depositing the crimped, drawn filaments onto a forming surface to form a nonwoven web. In general, a higher drawing air temperature results in a higher number of crimps, provided that the temperature is not so high as to heat the filaments to a temperature above the melting point of the lowest melting component polymer of the filaments. In accordance with this process, the multicomponent conjugate filaments have a conjugate filament configuration that is amenable for thermal crimping processes. For example, a conjugate filament having two component polymers (bicomponent filaments) may have a side-by-side or eccentric sheath-core cross-sectional configuration.

The nonwoven web formed from the spunbond conjugate filaments is subsequently bonded using any effective bonding means that heats the web to a temperature sufficiently high enough to melt the lowest melting component polymer but below the melting point of the higher melting structural component polymers of the web, thereby causing the filaments to form interfiber bonds, especially at cross-over contact points, throughout the web. For example, a through-air bonding, oven bonding, or infrared bonding process that effects interfiber bonds without applying significant compacting pressure can be used. Particularly suitable of these is a through-air bonding process which effects interfiber bonds by thoroughly and evenly heating the web with a penetrating flow of forced, heated air.

The conjugate filaments of the lofty layer are produced from a wide variety of thermoplastic polymers that are known to form fibers. Desirably, the thermoplastic polymers have a resistivity greater than about $10^{13}$ ohms-cm, more desirably greater than about $10^{14}$ ohms-cm, as measured in accordance with ASTM 257-61. As indicated above, the conjugate filaments contain at least two component polymers having different melting points. In accordance with the present invention, at least one of the component polymers is selected from polymers that are electretizable and form a highly durable electret. Particularly suitable electretizable polymers include polyolefins. Examples of suitable polyolefins include polyethylene, e.g., high density polyethylene, low density polyethylene and linear low density polyethylene; polypropylene, e.g., isotactic polypropylene, syndiotactic polypropylene, and blends of isotactic polypropylene and atactic polypropylene; polybutene, e.g., poly(1-butene) and poly(2-butene); polypentene, e.g., poly(1-pentene), poly (2-pentene), poly(3-mehtyl-1-pentene) and poly(4-methyl-1-pentene); copolymers thereof, e.g., ethylene-propylene copolymers; and blends thereof. Polymers suitable for the other component polymers of the conjugate filaments include above-illustrated polyolefins; polyamides, e.g., nylon 6, nylon 6/6, nylon 10, nylon 12 and the like; polyesters, e.g., polyethylene terephthalate, polybutylene terephthalate and the like; polycarbonates; polystyrenes; thermoplastic elastomers, e.g., ethylene-propylene rubbers, styrenic block copolymers, copolyester elastomers and polyamide elastomers and the like; fluoropolymers, e.g., polytetrafluoroethylene and polytrifluorochloroethylene; vinyl polymers, e.g., polyvinyl chloride; polyurethanes; and blends and copolymers thereof.

In accordance with the present invention, particularly suitable conjugate filaments are bicomponent filaments, and particularly desirable pairs of component polymers include polyolefin-polyamide, e.g., polyethylene-nylon 6, polyethylene-nylon 6/6, polypropylene-nylon 6, polypropylene-nylon 6/6, polyethylene-a copolymer of nylon 6 and nylon 6/6, and polypropylene-a copolymer of nylon 6 and nylon 6/6; polyolefin-polyester, e.g., polyethylene-polyethylene terephthalate, polypropylene-polyethylene terephthalate, polyethylene-polybutylene terephthalate and polypropylene-polybutylene terephthalate; and polyolefin-polyolefin, e.g., polyethylene-polypropylene and polyethylene-polybutylene. Of these pairs, more particularly desirable are polyolefin-polyolefin pairs, e.g., linear low density polyethylene-isotactic polypropylene, high density polyetylene-isotactic polypropylene and ethylene-propylene copolymer-isotactic polypropylene.

In accordance with the present invention, the laminate filter medium has at least one microfiber web layer in addition to the lofty layer. Desirably, the basis weight of the microfiber web layer of the laminate filter media is between about 7 g/m² (gsm) and about 100 gsm, more desirably between about 10 gsm and about 70 gsm. The microfiber web layer of the filter medium is characterized in that it contains relatively closely distributed microfibers. Particularly desirable nonwoven webs for the microfiber web layer of the present invention are meltblown fiber webs. The term "meltblown fibers" as used herein indicates fibers formed by extruding a molten thermoplastic polymer through a plurality of fine, usually circular, die capillaries as molten threads or filaments into a high velocity gas stream which attenuate the filaments of molten thermoplastic polymer to reduce their diameter. As is known in the art, the flow rate and pressure of the attenuating gas stream can be adjusted to form continuous meltblown filaments or discontinuous fibers. The formed air-borne fibers, which are not fully quenched, are carried by the high velocity gas stream and deposited on a collecting surface to form a web of randomly dispersed and autogenously bonded meltblown fibers. An exemplary process for producing meltblown fiber web is disclosed in U.S. Pat. No. 3,849,241 to Butin et al. In general, microfibers, especially meltblown fibers, have an average fiber diameter of up to about 10 μm. Desirably, microfibers suitable for the microfiber layer have an average fiber diameter between about 1.5 μm and about 8 μm, more desirably between about 2 μm and about 6 μm.

The microfiber layer of the laminate filter media can be produced from a wide variety of thermoplastic polymers that are electretizable and form a highly durable electret. Particularly suitable electretizable polymers include polyolefins, such as the polyolefins illustrated above in conjunction with the conjugate filaments.

In accordance with the present invention, both the lofty layer and the microfiber web layer are electretized. Electret treating processes suitable for the present invention are known in the art. These methods include thermal, plasma-contact, electron beam and corona discharge methods, and electretizing processes can be applied during the fiber spinning stage of the nonwoven web forming process or after the nonwoven web is fully formed. For example, U.S. Pat. No. 4,215,682 to Kubik et al. discloses an electretizing process for meltblown fibers that imparts a permanent electrostatic charge during the fiber spinning process, and U.S. Pat. Nos. 4,375,718 to Wadsworth et al. and 5,401,446 to Tsai et al. disclose electretizing processes for fully formed nonwoven webs.

The individual layers of the laminate fiter media or the filter media can be conveniently electretized by sequentially subjecting the web to a series of electric fields such that adjacent electric fields have substantially opposite polarities with respect to each other. For example, one side of web is initially subjected to a positive charge while the other side is subjected to a negative charge, and then the first side of the web is subjected to a negative charge and the other side of the web is subjected to a positive charge, imparting permanent electrostatic charges in the web. A suitable apparatus for electretizing the nonwoven web is illustrated in FIG. An electretizing apparatus 10 receives a nonwoven web 12 having a first side 14 and a second side 15. The web 12 passes into the apparatus 10 with the second side 15 in contact with guiding roller 16. Then the first side 14 of the web comes in contact with a first charging drum 18 which rotates with the web 12 and brings the web 12 into a position between the first charging drum 18 having a negative electrical potential and a first charging electrode 20 having a positive electrical potential. As the web 12 passes between the charging electrode 20 and the charging drum 18, electrostatic charges are developed in the web 12. A relative positive charge is developed in the first side and a relative negative charge is developed in the second side. The web 12 is then passed between a negatively charged second drum 22 and a positively charged second electrode 24, reversing the polarities of the electrostatic charge previously imparted in the web and permanently imparting the newly developed electrostatic charge in the web. The electretized web 25 is then passed on to another guiding roller 26 and removed from the electretizing apparatus 10. It is to be noted that for discussion purposes, the charging drums are illustrated to have negative electrical potentials and the charging electrodes are illustrated to have positive electrical potentials. However, the polarities of the drums and the electrodes can be reversed and the negative potential can be replaced with ground. In accordance with the present invention, the charging potentials useful for electretizing processes may vary with the field geometry of the electretizing process. For example, the electric fields for the above-described electretizing process can be effectively operated between about 1 KVDC/cm and about 30 KVDC/cm, desirably between about 4 KVDC/cm and about 20 KVDC/cm, when the gap between the drum and the electrodes is between about 1.2 cm and about 5 cm. The above-described suitable electretizing process is further disclosed in above-mentioned U.S. Pat. No. 5,401,446, which in its entirety is herein incorporated by reference.

The layers of the laminate filter media of the present invention can be adjoined by various means that intimately juxtapose the layers together. For example, the layers can be bonded to have uniformly distributed bond points or regions. Useful bonding means for the present invention include adhesive bonding, e.g., print bonding; thermal bonding, e.g., point bonding; and ultrasonic bonding processes, provided that the selected bonding process does not alter, e.g., diminish, the permeability or porosity of the web layers or the interface of the layers to a degree that makes the laminate undesirable for its intended use. Alternatively, the layers can be bonded only at the peripheral edges of the media, relying on the pressure drop across the media during use to form juxtaposed laminates. As yet another alternative, the layers can be sequentially formed on a forming surface. For example, a lofty spunbond layer is formed on a forming surface, and then the lofty layer is conveyed under a meltblown web-forming apparatus and a meltblown fiber web layer is directly formed on the lofty layer, thereby forming a firmly attached laminate filter medium.

The basis weight of the laminate filter media may vary widely. However, particularly suitable filter media have a basis weight from about 10 gsm to about 500 gsm, more particularly from about 14 gsm to about 450 gsm, and most particularly from about 15 gsm to about 340 gsm. In accordance with the invention, the filter media contain between about 5 wt % and 95 wt % of the lofty layer and between about 95 wt % and 5 wt % of the microfiber web layer, based on the total weight of the filter media. Desriably, the filter media contain between about 50 wt % and 94 wt % of the lofty layer and between about 60 wt % and 6 wt % of the microfiber web layer.

The laminate filter media of the present invention provide a high filter efficiency and a long service-life. Surprisingly, it has been found that the lofty layer and the microfiber web layer of the laminate filter media synergistically improve the filter efficiency while substantially maintaining the long service-life of the lofty layer. The filter media are highly suitable for HVAC filters, combustion engine filters and the like that require high filtration throughput rate and relatively low pressure drop across the filter media.

The following examples are provided herein as illustration of the invention, and the scope of the present invention is not limited thereto.

EXAMPLES

Test Procedures Used:

NaCl Filter Efficiency Test: This test method determines filter retention of sodium chloride particles in an apparatus that sends a flow of NaCl aerosol particles suspended in air at a rate of 5 ft/min. into a 0.5 ft$^2$ filter medium. The NaCl particles were generated into an aerosol from a 1% NaCl solution by a Laskin nozzle type atomizer, and the particle size range was between approximately 0.1 μm and 3 μm. The efficiency of the filter medium was determined by measuring the particle size distribution and number of particles at positions upstream and downstream of the test filter medium. The efficiency was defined as 100 * . (1-(downstream particle counts/upstream particle counts)). The particle sizes and counts were measured using an automatic particle counter and sensor, HIAC/ROYCO Model 5109/1230, which are available from Pacific Scientific Co., Silver Spring, Md.

Filter Pressure Drop: A fresh filter medium was placed in the above NaCl filter efficiency testing apparatus, and the pressure drop across the filter medium was measured in mm of water. The measured pressure drop is the pressure difference between the influent stream and the effluent stream across the filter medium.

ASHRAE 52.1 Filter Efficiency Test: This test measures the efficiency of a filter medium with a standardized ASHRAE dust. The test procedure was similar to the NaCl test, except test dust particles were injected into the air stream and a HIAC/ROYCO Model 8000 automatic particle counter was used. The ASHRAE dust contained 72% standard AC fine, 23% powder carbon black and 5% cotton linters. The ASHRAE test was conducted on a 1 square feet (0.093 m$^2$) filter medium at a higher air flow rate than the NaCl test, and the air flow rate used was 25 ft/min.

Frazier permeability: The Frazier permeability, which expresses the permeability of a fabric in terms of cubic feet per minute of air per square foot of medium at a pressure drop of 0.5 inch (1.27 cm) of water, was determined utilizing a Frazier Air Permeability Tester available from the Frazier Precision Instrument Company and measured in accordance with Federal Test Method 5450, Standard No. 191A.

Density: The density of each filter medium was calculated from the basis weight and the caliper, which was measured at 3.5 g/cm$^2$ (0.05 psi) with a Starret-type bulk tester.

Example 1 (Ex1)

A low density through-air bonded spunbond web containing bicomponent conjugate filaments was produced in accordance with the procedure outlined in aforementioned U.S. Pat. No. 5,382,400. The bicomponent spunbond web contained linear low density polyethylene-polypropylene conjugate spunbond filaments and had a basis weight of 102 gsm (3.0 osy) and a density of 0.039 g/cm$^3$. Linear low density polyethylene, Aspun 6811A, which is available from Dow Chemical, was blended with 2 wt % of a TiO$_2$ concentrate containing 50 wt % of TiO$_2$ and 50 wt % of a polypropylene, and the mixture was fed into a first single screw extruder. Polypropylene, PD3443, which is available from Exxon, was blended with 2 wt % of the above-described TiO$_2$ concentrate, and the mixture was fed into a second single screw extruder. The extruded polymers were spun into round bicomponent fibers having a side-by-side configuration and a 1:1 weight ratio of the two polymers using a bicomponent spinning die, which had a 0.6 mm spinhole diameter and a 6:1 L/D ratio. The temperatures of the molten polymers fed into the spinning die were kept at 450° F., and the spinhole throughput rate was 0.5 gram/hole/minute. The bicomponent fibers exiting the spinning die were quenched by a flow of air having a flow rate of 0.5 m$^3$/min/m$^2$ (45 SCFM/inch) spinneret width and a temperature of 18° C. (65° F.). The aspirator was equipped with a temperature controlled aspirating air source, and the feed air temperature was kept at about 177° C. (350° F.). The fibers for each test specimen entering the aspirator were drawn with the heated feed air at a flow rate of 19 ft$^3$/minute/inch width. The weight-per-unit-length measurement of the drawn fibers was about 3 denier per filament (3.3 dtex). The drawn fibers were then deposited on a foraminous forming surface with the assist of a vacuum flow to form an unbonded fiber web. The unbonded fiber web was bonded by passing the web on a foraminous supporting surface through a through-air bonder that applied a flow of heated air at a temperature of 133° C. (272° F.) and a velocity of 30.5 m/min (200 feet/min). The residence time for each web specimen in the bonder was about 2–4 seconds. The bonded nonwoven webs were charged by passing the web at a speed of 100 ft/min through an electretizing apparatus that contained two sections. The first section of the electretizing apparatus had a wire electrode, which was placed above the web and had a positive potential of about 16 KV, and a roller, which was placed below the web and was grounded; and the second section had a charging roller, which was placed above the web and had a negative potential of about 7.5 KV, and a wire electrode, which was placed below the web and had a positive potential of about 25 KV. The gap between the charging electrode and the roller was kept at about 2.54 cm (1 inch).

A 10 gsm (0.3 osy) polypropylene meltblown web was produced in accordance with the process described in U.S. Pat. No. 3,978,185 to Butin et al. The polypropylene was Himont's HH441. The meltblown web was electretized in accordance with the above-described process.

A layer of the electretized lofty spunbond web and a layer of the electretized meltblown web were cut to 28 cm by 36 cm rectangles. The two layers were placed in the NaCl filter efficiency testing apparatus, placing the lofty layer toward the influent side. The laminate filter medium was tested for various filter properties. The results are shown in Table 1.

Comparative Example 1 (C1)

The lofty electretized spunbond web of Example 1 was tested for its filter properties. The results are shown in Table 1.

Comparative Example 2 (C2)

The electretized meltblown web of Example 1 was tested for its filter properties. The results are shown in Table 1.

Comparative Example 3 (C3)

A 20 gsm (0.6 osy) meltblown web was prepared in accordance with the process described in U.S. Pat. No. 3,978,185 to Butin et al., and the polymer used was Himont's PS015 polypropylene. The web was electretized by following the electretizing process outlined in Example 1. The electretized meltblown web was tested for its filter properties. The results are shown in Table 1.

TABLE 1

|  | Ex1 | C1 | C2 | C3 |
|---|---|---|---|---|
| Basis Wt. (osy) | 3.3 | 3.0 | 0.3 | 0.6 |
| (g/m²) | 112 | 102 | 10 | 20 |
| Density (g/cm3) | — | 0.030 | — | — |
| Filter Pressure Drop (mm H₂O) | 0.7 | 0.23 | 0.4 | 1.3 |
| Frazier Permeability (m³/min/m²) | 56 | 131 | 92 | 27 |
| Filter Efficiency NaCl Test (%) | 90 | 70 | 63 | 85 |

As can be seen from the filter efficiency results of Example 1 and Comparative Examples 1–3, the combination of the lofty layer, C1, and the microfiber layer, C2, synergistically improves the filter efficiency without unduely increasing the filter pressure drop. In addition, the filter efficiency, pressure drop and Frazier permeability data of Example 1 and Comparative Example 3 clearly demonstrate that the laminate filter media of the present invention not only have significantly improved filter efficiency over microfiber web filter media but also do not require the high driving pressure of the microfiber web filter media.

Example 2 (Ex2)

A three-layer laminate filter medium was prepared. The filter medium had a layer of a 17 gsm (0.5 osy) point bonded spunbond web, a middle layer of a 54 gsm (1.6 osy) meltblown web and a layer of a 102 gsm (3.0 osy) lofty spunbond web. The point bonded spunbond web was prepared in accordance with U.S. Pat. No. 3,855,046 to Hansen et al. using PD3443 polypropylene, and the web was pattern bonded with a diamond pattern of 225 bonds per square inch (35 bonds/cm²) covering about 25% of the surface area. The meltblown web and the lofty conjugate filament spunbond web were prepared in accordance with the processes described in Example 1. The lofty spunbond layer and the meltblown layer were electretized in accordance with the procedure outlined in Example 1. Then the three layers were cut to 28 cm by 36 cm rectangles. Then the three layers were positioned in a laminate form, and the complete peripheral edge of the laminate was thermally bonded.

The filter medium was tested for various filter properties including its filter capacity and efficiency. The filter capacity, which corresponds to the filter service-life, was tested using the ASHRAE filter efficiency test setup. The efficiency test was run until the pressure drop across the medium reached 2.54 cm (1.0 inch) H₂O. The filter medium was removed from the apparatus and the weight gain was measured. The weight gain indicates the filter capacity of the medium.

Comparative Example 4 (C4)

A three-layer laminate filter medium was prepared as in Example 2, except the lofty spunbond web was replaced with a 92 gsm (2.7 osy) air laid nonwoven web. The air laid nonwoven web was obtained by delaminating the air laid nonwoven web layer of an industrial HVAC filter which is available from Hollings and Bose. The air laid nonwoven web was not an electret web.

The filter property tests were conducted in accordance with Example 2. The results are shown in Table 2.

Comparative Example 5 (C5)

The electretized meltblown layer of Example 2 was tested for its filter properties. The results are shown in Table 2.

Comparative Example 6 (C6)

The electretized lofty spunbond layer of Example 2 was tested for its filter properties. The results are shown in Table 2.

Comparative Example 7 (C7)

The air laid nonwoven layer of Comparative Example 4 was tested for its filter properties. The results are shown in Table 2.

TABLE 2

|  | Ex2 | C4 | C5 | C6 | C7 |
|---|---|---|---|---|---|
| Basis Wt. (osy) | 5.1 | 4.8 | 1.6 | 3.0 | 2.7 |
| (g/m²) | 173 | 163 | 54 | 102 | 92 |
| Density (g/cm3) | — | — | — | 0.029 | 0.036 |
| Frazier Permeability (m³/min/m²) | — | — | — | 152 | 152 |
| Filter Efficiency ASHRAE (%) | 94.4 | 90.6 | — | — | — |
| Filter Capacity (g) | 14.2 | 5.2 | — | — | — |

Despite the fact that the laminate filter media of Example 2 and Comparative Example 4 had similar physical properties, e.g., similar basis weight, permeability, porosity and construction, the filter medium of the present invention exhibited highly superior filter efficiency and filter capacity over the Comparative Example 4 filter medium. The only difference between the two filter media of Example 2 and Comparative Example 4 was that the Example 2 filter medium contained an electretized lofty spunbond layer of the present invention whereas the Comparative Example 4 contained a nonelectret air laid web layer. This result clearly demonstrate that the electret lofty spunbond web layer of the present invention in combination with the electret microfiber web layer synergistically improves the filter efficiency of the laminate filter medium.

What is claimed is:

1. A laminate filter medium comprising an electret lofty spunbond web and an electret microfiber web, said spunbond web having a density between about 0.01 g/cm³ and about 0.1 g/cm³, wherein said filter medium is self supporting.

2. The laminate filter medium of claim 1 wherein said lofty spunbond web comprises crimped multicomponent spunbond filaments.

3. The laminate filter medium of claim 2 wherein said multicomponent spunbond filaments are bicomponent spunbond filaments.

4. The laminate filter medium of claim 3 wherein said bicomponent spunbond filaments comprise a polyolefin component.

5. The laminate filter medium of claim 4 wherein said bicomponent spunbond filaments comprises polyethylene and polypropylene, and said filaments having a side-by-side or eccentric sheath-core configuration.

6. The laminate filter medium of claim 2 wherein said microfiber web is a meltblown fiber web comprising a polyolefin component.

7. The laminate filter medium of claim 6 wherein said crimped multicomponent spunbond filaments have between about 2 and about 50 crimps per extended inch, as measured in accordance with ASTM D-3937-82.

8. The laminate filter medium of claim 6 wherein said filter medium has a basis weight between about 10 gsm and about 500 gsm.

9. The laminate filter medium of claim 8 wherein said meltblown fiber web comprises between about 5 wt % and about 95 wt % of said filter medium, based on the total weight of said medium.

10. The laminate filter medium of claim 9 wherein said multicomponent spunbond filaments are side-by-side bicomponent filaments comprising linear low density polyethylene and polypropylene, and said meltblown fiber web comprises polypropylene.

11. A laminate filter medium comprising:
   a) an electret lofty spunbond web, said spunbond web comprising crimped multicomponent conjugate spunbond filaments and said spunbond web having a density between about 0.01 g/cm$^3$ and about 0.1 g/cm$^3$, and
   b) an electret meltblown fiber web,
   wherein said conjugate filaments comprises at least one polyolefin component and said meltblown fibers comprise a polyolefin component.

12. The laminate filter medium of claim 11 wherein said multicomponent spunbond filaments are bicomponent spunbond filaments comprising polypropylene.

13. The laminate filter medium of claim 12 wherein said meltblown fibers have an average diameter between about 1.5 μm and about 8 μm.

14. The laminate filter medium of claim 13 wherein said bicomponent spunbond filaments comprise polypropylene and polyethylene.

15. The laminate filter medium of claim 14 wherein said bicomponent spunbond filaments have between about 2 and about 50 crimps per extended inch, as measured in accordance with ASTM D-3937-82.

16. The laminate filter medium of claim 15 wherein said bicomponent spunbond filament comprise linear low density polyethylene and polypropylene, and said meltblown fibers comprise polypropylene.

17. The laminate filter medium of claim 16 wherein said laminate filter medium has a basis weight between about 10 gsm and about 500 gsm.

18. The laminate filter medium of claim 17 wherein said electret lofty spunbond web comprises between about 5 wt % and about 95 wt % of said filter medium, based on the total weight of said medium.

19. The laminate filter medium of claim 18 wherein said electret lofty spunbond web comprises between about 50 wt % and about 94 wt % of said filter medium, based on the total weight of said medium.

20. A process for filtering a gas medium, which process comprises the steps of:
   a) providing an electret laminate filter medium, and
   b) passing said gas medium across said laminate filter medium, wherein
   said laminate filter medium comprises:
      a) an electret lofty spunbond web, said spunbond web comprising crimped bicomponent conjugate spunbond filaments and said spunbond web having a density between about 0.01 g/cm$^3$ and about 0.1 g/cm$^3$, and
      b) an electret meltblown fiber web,
      wherein said conjugate filaments comprises at least one polyolefin component and said meltblown fibers comprise a polyolefin component.

* * * * *